(12) United States Patent
Takagi

(10) Patent No.: US 8,373,385 B2
(45) Date of Patent: Feb. 12, 2013

(54) NON-CONTACT CHARGER AND NON-CONTACT CHARGING SYSTEM

(75) Inventor: Izumi Takagi, Kuwana (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1156 days.

(21) Appl. No.: 12/071,674

(22) Filed: Feb. 25, 2008

(65) Prior Publication Data

US 2008/0205919 A1 Aug. 28, 2008

(30) Foreign Application Priority Data

Feb. 28, 2007 (JP) ................................. 2007-048666

(51) Int. Cl.
*H02J 7/00* (2006.01)
(52) U.S. Cl. ........................................ 320/108; 320/115
(58) Field of Classification Search .................. 320/109
See application file for complete search history.

(56) References Cited

U.S. PATENT DOCUMENTS

| 2004/0145343 A1* | 7/2004 | Naskali et al. ................ 320/108 |
| 2008/0079392 A1* | 4/2008 | Baarman et al. .............. 320/108 |

FOREIGN PATENT DOCUMENTS

| JP | A-3-239137 | 10/1991 |
| JP | A-6-225465 | 8/1994 |
| JP | 07031064 A * | 1/1995 |
| JP | A-7-31064 | 1/1995 |
| JP | A 2002-34169 | 1/2002 |
| JP | A 2003-47180 | 2/2003 |
| JP | 2006230129 A * | 8/2006 |
| JP | A-2006-230129 | 8/2006 |

OTHER PUBLICATIONS

Chinese Office Action issued in Chinese Patent Application No. 200810082047.1 on Feb. 24, 2010 (with translation).

* cited by examiner

*Primary Examiner* — Edward Tso
*Assistant Examiner* — Robert Grant
(74) *Attorney, Agent, or Firm* — Oliff & Berridge, PLC

(57) ABSTRACT

A non-contact charger includes: a casing having a recessed portion in which a cordless handset is placeable; a primary coil which is provided in the casing to be opposed to the cordless handset upon placement of the cordless handset in the recessed portion of the casing; an oscillating portion which is oscillatable to generate a magnetic flux energy from the primary coil; a detecting portion which detects at least one of a current value and a voltage value in the oscillating portion; and a controller which stops a generation of the magnetic flux energy based on at least one of the current value and the voltage value detected by the detecting portion.

15 Claims, 10 Drawing Sheets

US 8,373,385 B2

NON-CONTACT CHARGER AND NON-CONTACT CHARGING SYSTEM

CROSS REFERENCE TO RELATED APPLICATION

The present application claims priority from Japanese Patent Application No. 2007-48666, which was filed on Feb. 28, 2007, the disclosure of which is herein incorporated by reference in its entirety.

BACKGROUND OF THE INVENTION

1. Field of the Invention

The present invention relates to a non-contact charger and a non-contact charging system which prevent a metallic foreign matter such as a coin from being heated.

2. Discussion of Related Art

There is known a non-contact charger which charges an equipment that is placed therein so as to be charged. In the non-contact charger, the placed equipment is charged with electricity by transmitting a magnetic flux energy (electromagnetic induction energy). When a metallic foreign matter such as a coin is placed in the non-contact charger, the foreign matter is heated by an eddy current. In order to prevent the foreign matter from being heated, a technique has been developed, which detects whether the equipment to be charged or the foreign matter is placed in the non-contact charger.

For example, Patent Document 1 (JP-A-2002-34169) discloses an non-contact charger in which a mobile phone as the equipment to be charged is arranged to change a charging load according to a predetermined pattern upon placement of the mobile phone for initiation of charging. The non-contact charger keeps generating the magnetic flux energy that is enough to charge the mobile phone only when the non-contact charger detects a change of the charging load according to the predetermined pattern during a predetermined time period. On the other hand, in a case where the foreign matter such as the coin is placed in the non-contact charger, it is impossible that the non-contact charger detects such a charging load change according to the predetermined pattern during the predetermined time period. Thus, it is apparent that the foreign matter instead of the mobile phone is placed in the non-contact charger, so that heating of the foreign matter is prevented by means that the non-contact charger generates an imperceptible volume of the magnetic flux energy or stops a generation of the magnetic flux energy.

However, in order that the mobile phone changes the charging load according to the predetermined pattern and the non-contact charger detects the change of the charging load, the mobile phone and the non-contact charger need to incorporate respective circuits having complicated structures.

SUMMARY OF THE INVENTION

It is therefore an object of the present invention to provide a non-contact charger and a non-contact charging system which prevent the heating of the foreign matter and have a simply-structured (simply-constructed) circuit.

According to the present invention, there are provided various modes of the non-contact charger mentioned below.

(1) A non-contact charger comprising:

a casing having a recessed portion in which a cordless handset is placeable;

a primary coil which is provided in the casing to be opposed to the cordless handset upon placement of the cordless handset in the recessed portion of the casing;

an oscillating portion which is oscillatable to generate a magnetic flux energy from the primary coil;

a detecting portion which detects at least one of a current value and a voltage value in the oscillating portion; and a controller which stops a generation of the magnetic flux energy based on the at least one of the current value and the voltage value detected by the detecting portion.

In the non-contact charger of mode (1), when the foreign matter is placed in the recessed portion of the casing in which the cordless handset is placeable, the detecting portion detects the at least one of the current value and the voltage value, and the controller stops the generation of the magnetic flux energy generated from the primary coil, so that the non-contact charger can prevent the foreign matter placed in the recessed portion from being heated, without a circuit having a complicated structure.

(2) The non-contact charger according to mode (1), wherein the controller stops the generation of the magnetic flux energy in a case where the at least one of the current value and the voltage value detected by the detecting portion does not satisfy a predetermined condition.

(3) The non-contact charger according to mode (2), wherein the detecting portion detects the current value as the at least one of the current value and the voltage value, and wherein the controller determines that the current value does not satisfy the predetermined condition in a case where the current value detected by the detecting portion is smaller than a predetermined current reference value, and stops the generation of the magnetic flux energy.

(4) The non-contact charger according to any of modes (1) through (3), wherein the controller stops the generation of the magnetic flux energy by stopping an oscillation of the oscillating portion.

(5) The non-contact charger according to any of modes (1) through (3), further comprising a switch portion, and wherein the controller stops the generation of the magnetic flux energy by operating the switch portion.

(6) The non-contact charger according to mode (5), wherein the switch portion is provided in a portion of the oscillating portion in which a current flowing therethrough is minimized.

(7) The non-contact charger according to any of modes (2) through (6), wherein the controller includes an energy-restarting portion which restarts the generation of the magnetic flux energy in a case where a second condition different from the predetermined condition as a first condition is satisfied after the generation of the magnetic flux energy is stopped.

(8) The non-contact charger according to mode (7), wherein the second condition includes a condition in which a predetermined time elapses after the generation the magnetic flux energy is stopped.

(9) The non-contact charger according to mode (8), wherein the controller includes a timer portion which detects elapse of the predetermined time, and wherein the controller restarts the generation of the magnetic flux energy based on a detection of the elapse of the predetermined time by the timer portion.

(10) The non-contact charger according to any of modes (1) through (9), wherein the controller includes a two-reference-value-comparing controller which compares the at least one of the current value and the voltage value as a detected value detected by the detecting portion with two reference values different from each other, and which controls the generation of the magnetic flux energy based on first comparison of the detected value with one of the two reference values and second comparison of the detected value with the other of the two reference values.

(11) The non-contact charger according to mode (10), wherein the two reference values consist of a lower current reference value and an upper current reference value as the one and the other of the two reference values.

(12) The non-contact charger according to mode (11), wherein the controller includes an oscillation-maintaining portion which controls the oscillating portion to maintain the generation of the magnetic flux energy while the detected value detected by the detecting portion after the generation of the magnetic flux energy is started is not smaller than a first current reference value as the one of the two reference values.

(13) The non-contact charger according to any of modes (1) through (12), wherein the controller includes an erroneous-determination-preventing-type stop portion which stops the generation of the magnetic flux energy, and prevents an erroneous determination, which erroneously determines that a foreign matter is placed in the recessed portion of the casing based on the detected value when the detected value is in a transient state.

(14) The non-contact charger according to mode (13), wherein the erroneous-determination-preventing-type stop portion includes a re-detecting portion which causes the detecting portion to detect again the detected value in a case where the detected value is in the transient state.

(15) The non-contact charger according to mode (14), wherein the controller includes a two-reference-value-comparing controller which compares the at least one of the current value and the voltage value as a detected value detected by the detecting portion with two reference values different from each other, and which controls the generation of the magnetic flux energy based on first comparison of the detected value with one of the two reference values and second comparison of the detected value with the other of the two reference values, and wherein the re-detecting portion determines that the detected value is in the transient state in a case where the detected value is between the two reference values, and causes the detecting portion to detect again the detected value after elapse of a waiting time that is longer than a first transitional time and a second transitional time, the first transitional time corresponding to a length of time from the placement of the cordless handset in the recessed portion of the casing until placement of the detected value from the transient state to a first steady state, the second transitional time corresponding to a length of time from removal of the cordless handset from the recessed portion of the casing until placement of the detected value from the transient state to a second steady state.

(16) The non-contact charger according to mode (14), wherein the re-detecting portion includes a transitional-state detecting portion which causes the detecting portion to detect the detected value twice with a predetermined interval so as to obtain two detected values and which determines that the detected value is in the transient state in a case where a difference between the two detected values is not less than a predetermined difference.

(17) The non-contact charger according to mode (13), wherein the erroneous-determination-preventing-type stop portion causes the detecting portion to detect the detected value twice so as to obtain two detected values with an interval that is longer than a first transitional time and a second transitional time, the first transitional time corresponding to a length of time from the placement of the cordless handset in the recessed portion of the casing until placement of the detected value from the transient state to a first steady state, the second transitional time corresponding to a length of time from removal of the cordless handset from the recessed portion of the casing until placement of the detected value from the transient state to a second steady state, and stops the generation of the magnetic flux energy in a case where both of the two detected values are between the two reference values.

(18) The non-contact charger according to mode (1), wherein the detecting portion includes a circuit which detects the current value in the oscillating portion.

According to the present invention, there are also provided various modes of the non-contact charging system mentioned below.

(19) A non-contact charging system comprising:
the non-contact charger according to any of modes (1) through (18); and
the cordless handset which is freely attachable to and detachable from the recessed portion of the casing and which includes a secondary coil which is opposed to the primary coil upon placement of the cordless handset in the recessed portion.

(20) The non-contact charging system according to mode (19), wherein the cordless handset further includes a constant current circuit which limits a current in the secondary coil to a predetermined constant value.

BRIEF DESCRIPTION OF THE DRAWINGS

The above and optional objects, features, and advantages of the present invention will be better understood by reading the following detailed description of the preferred embodiments of the invention when considered in conjunction with the accompanying drawings, in which.

DETAILED DESCRIPTION OF THE PREFERRED EMBODIMENTS

Hereinafter, there will be described preferred embodiments of the present invention with reference to the drawings.

Figure 3:
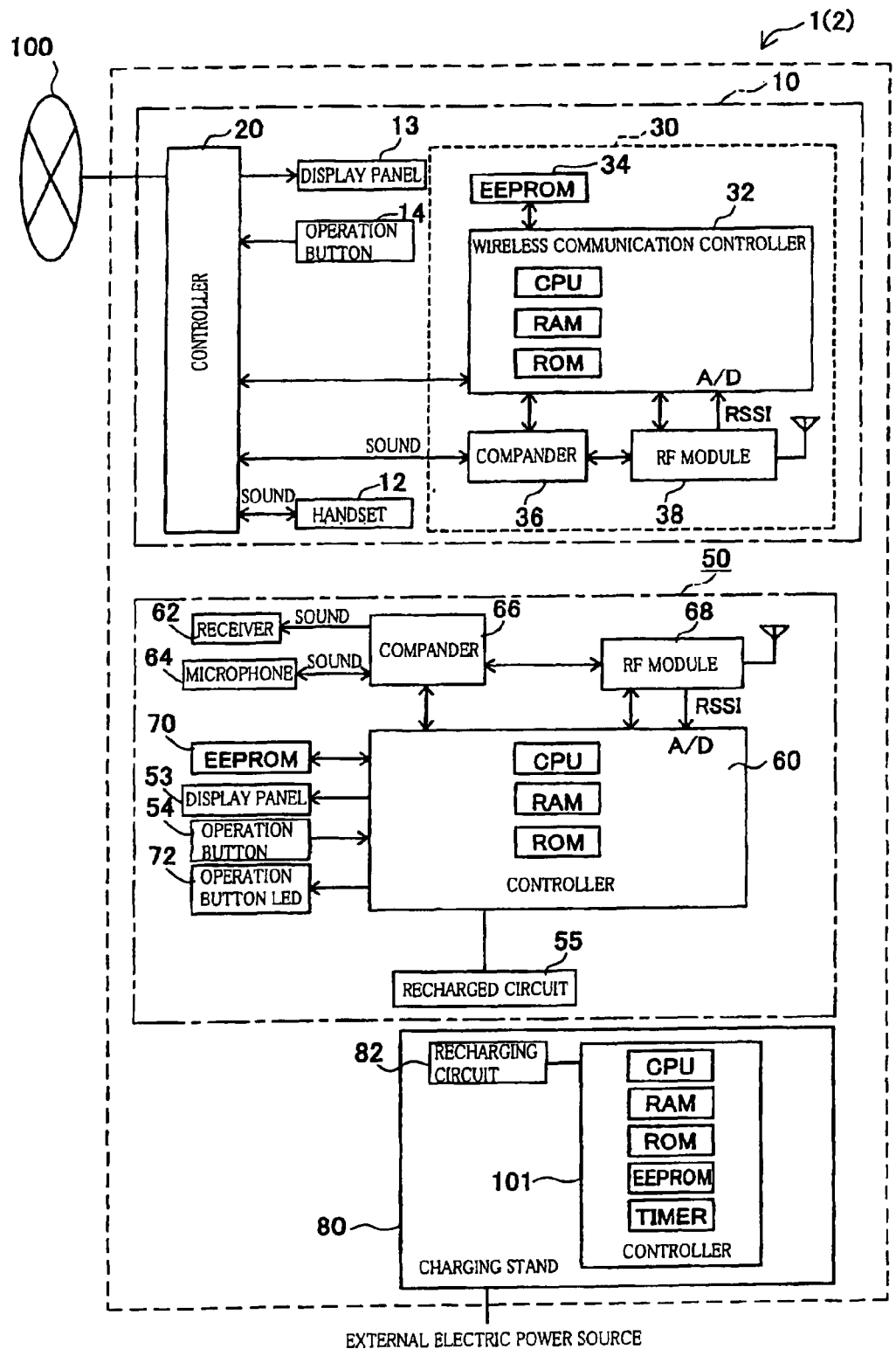
FIG. 3 is a block diagram illustrating an electric system of the telephone apparatus.
Figure 4:
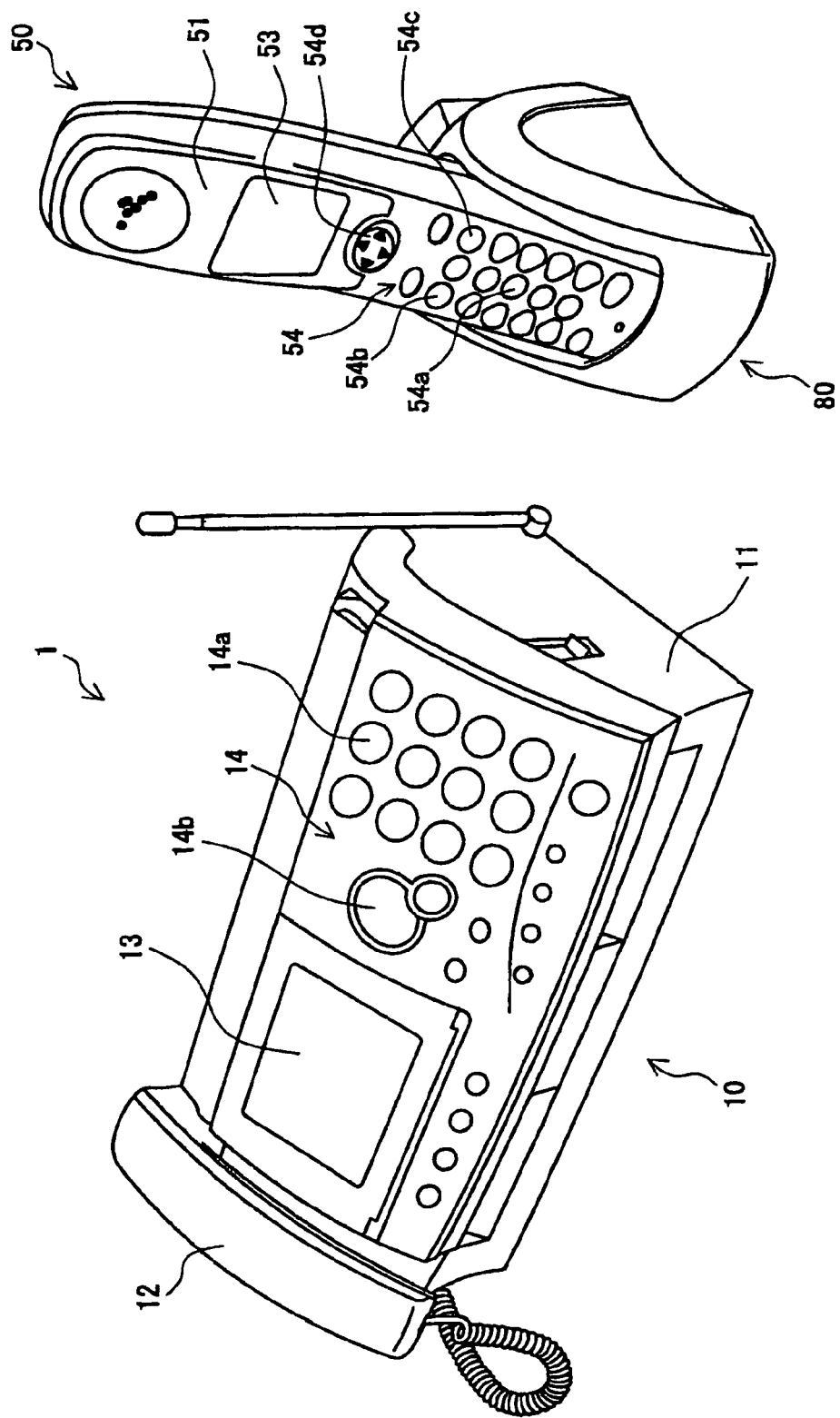
FIG. 4 is a perspective view of the telephone apparatus.

A cordless telephone apparatus 1 has functions including a telephone communicating function for conducting a verbal communication through a telephone network 100 (shown in FIG. 3) and a facsimile-machine function for transmitting and receiving image data through the telephone network 100. As shown in FIG. 4, the cordless telephone apparatus 1 includes: a main phone 10 which is connected to the telephone network 100; a cordless handset 50 which is connected to the main phone 10 through a wireless network; and a charging stand 80 which is connected to an external electric power source, and in which the cordless handset 50 is placeable. The charging stand 80 is provided to charge the cordless handset 50 placed in the charging stand 80 with a predetermined voltage. In the present embodiment, composing elements related to the facsimile-machine function are not directly related to the present invention, so that detailed descriptions thereof are omitted.

In the telephone apparatus 1, a handset 12 is attached to a side portion of a main body casing 11 of the main phone 10. The handset 12 functions as a transmitter and a receiver which are in use when the handset 12 is detached from the main body casing 11. In an upper surface of the main body casing 11, there are provided a display panel 13 which displays information related to various functions of the cordless telephone apparatus 1, and various operation buttons (keys) 14 including dial buttons 14a for inputting a phone number of who to contact, and a select button 14b which is operated by a user to select various commands of a menu indicated on the display panel 13. In the present embodiment, the display panel 13 constitutes a liquid crystal display (LCD) with backlighting from a rear side thereof.

The cordless handset 50, in an outer surface thereof, includes a display panel 53 which displays information related to various functions of the cordless telephone apparatus 1, and various operation buttons (keys) 54 including (1) dial buttons 54a for inputting a phone number of who to contact, (2) an outside (external) line button 54b which is operated by the user to start an outside call, (3) a cutting-line button 54c which is operated by the user to end (cut) the outside call, and (4) a select button 54b which is operated by the user to select various commands of a menu indicated on the display panel 53.

Figure 2A:
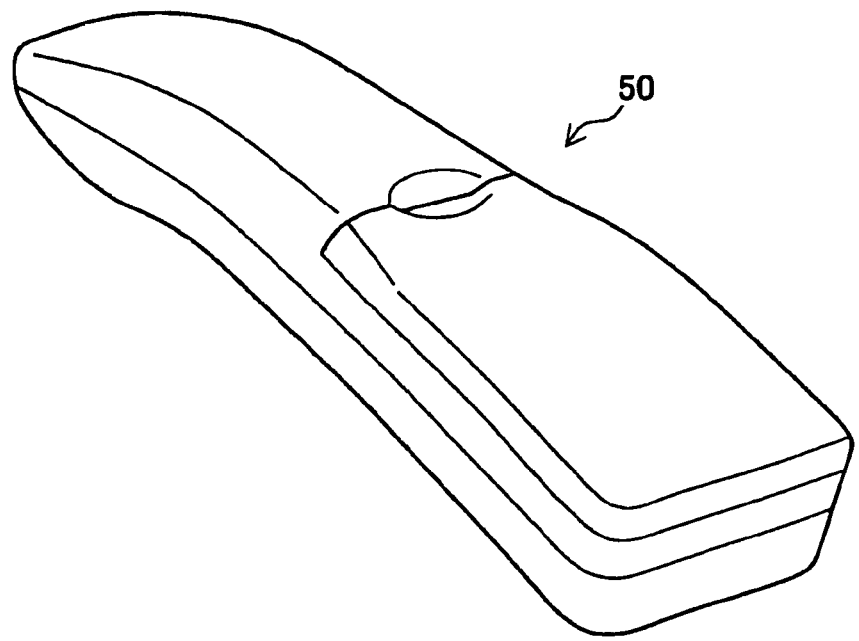
FIG. 2 is a perspective view of a cordless handset and a charging stand of the telephone apparatus.
Figure 2B:
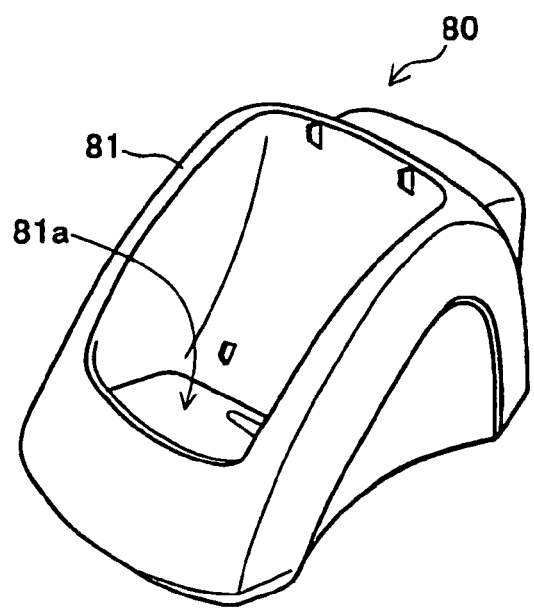

In the present embodiment, the display panel 53 constitutes a liquid crystal display (LCD) with backlighting from a rear side thereof. As shown in FIG. 2B, the charging stand 80 includes a main body 81 as a casing which has a recessed portion 81a. The cordless handset 50 is freely attachable to and detachable from the recessed portion 81a of the main body 81.

Next, there will be described an electric system of the cordless telephone apparatus 1 with reference to FIG. 3. The main phone 10 includes a controller 20 which controls various operations of the telephone apparatus 1, the handset 12, the display panel 13, the operation button 14, and a wireless communication portion 30.

The controller 20 receives an output signal supplied from the operation button 14, an output signal (a sound signal and a data signal) supplied from the wireless communication portion 30 and a sound signal supplied from outside of the telephone apparatus 1. Also, the controller 20 determines a transmission passage including a transmission destination to which the sound signal is inputted from the outside of the telephone apparatus 1, and a transmission source from which the sound signal is outputted to the outside of the telephone apparatus 1. More precisely, when the handset 12 is detached from the main body casing 11, the controller 20 determines the handset 12 as the transmission passage. When the user starts a call-starting operation to start a call by the cordless handset 50, the controller 20 determines the wireless communication portion 30 as the transmission passage.

Further, the controller 20 outputs a data signal and a sound signal for a wireless communication with the cordless handset 50 to the wireless communication portion 30, and outputs a sound signal from the handset 12 and the wireless communication portion 30 to the outside of the telephone apparatus 1.

The wireless communication portion 30 includes: a wireless communication controller 32 including a CPU (Central Processing Unit), a ROM (Read Only Memory), a RAM (Random Access Memory) and an A/D (Alternating-current/Direct-current) converter; an EEPROM (Electrically Erasable and Programmable Read Only Memory) 34; compander 36; and an RF (Radio Frequency) module for a wireless communication between the wireless communication portion 30 and the cordless handset 50.

The compander 36 receives a wireless signal outputted from the cordless handset 50 via the RF module 38, and sorts the received wireless signal into a sound signal and a data signal, so as to transmit the sound signal and the data signal to the controller 20 and the wireless communication controller 32, respectively. Also, the compander 36 transmits a sound signal supplied from the controller 20 and a data signal supplied from the wireless communication controller 32, to the RF module 38.

The RF module 38, which is configured to be communicable with the wireless communication controller 32, selects a wireless channel (that is used for a wireless communication) out of a plurality of wireless channels having respective different frequencies based on a command supplied from the wireless communication controller 32. Then, by using the selected wireless channel, the RF module 38 transmits an output signal supplied from the compander 36, to the cordless handset 50, and receives a wireless signal supplied from the cordless handset 50.

The wireless communication controller 32 receives data signals outputted (supplied) from the controller 20 and the compander 36, and outputs the data signal outputted (supplied) from the controller 20, to the compander 36.

Next, the cordless handset 50 includes: a controller 60 which controls various operations of the cordless handset 50; the display panel 53; the operation button 54; a receiver 62; a microphone 64; a compander 66; an RF module for a wireless communication between the cordless handset 50 and the main phone 10 (more precisely, the RF module 38), that is, wirelessly transmitting or receiving a sound signal and/or a data signal therebetween; an EEPROM 70; an operation-button LED (Light-Emitting Diode) 72 for backlighting the operation button 54 from a rear side thereof; and a recharged circuit 55 which charges a secondary battery 204 for supplying an electric power source to the cordless handset 50 with an electric power supplied from the charging stand 80.

The compander 66 receives a wireless signal outputted from the main phone 10 via the RF module 68, and sorts the wireless signal into a sound signal and a data signal, so as to transmit the sound signal and the data signal to the receiver 62 and the controller 60, respectively. Also, the compander 66 transmits a sound signal supplied from the microphone 64 and a data signal supplied from the controller 60, to the RF module 68.

The RF module 68, which is configured to be communicable with the controller 60, selects a wireless channel (that is used for a wireless communication) out of eighty-nine (a plurality of) wireless channels (having respective different frequencies), based on a command supplied from the controller 60. Then, by using the selected wireless channel, the RF module 68 transmits an output signal supplied from the compander 66, to the main phone 10, and receives a wireless signal supplied from the main phone 10.

The controller 60 includes a CPU, a RAM, a ROM, and an A/D converter, and receives an output signal from the operation button 54 and a data signal from the compander 66. Also, the controller 60 outputs a data signal for a wireless communication with the main phone 10.

The charging stand 80 includes (a) a controller 101 including a CPU, a RAM, a ROM, an EEPROM and a timer, and (b) a recharging circuit 82. The charging stand 80 generates a magnetic field by receiving an electric energy supplied from the external electric power source, and contactlessly supplies the electric energy to the cordless handset 50.

Figure 1:
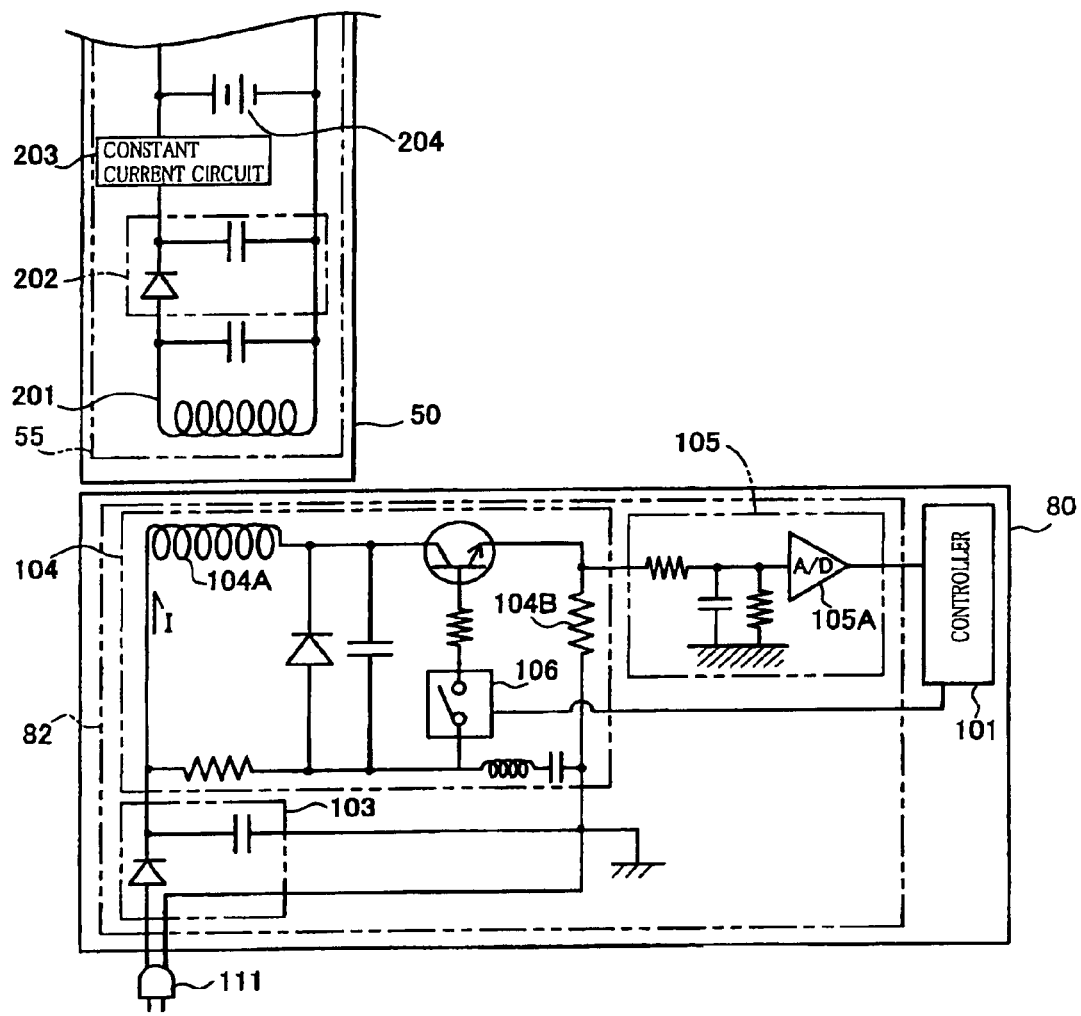
FIG. 1 is a block diagram illustrating an electric system of a telephone apparatus including a non-contact charger as one embodiment to which the present invention is applied.

There will be described a non-contact supply of the electric energy between the cordless handset 50 and the charging stand 80. As shown in FIG. 1, the recharging circuit 82 of the charging stand 80 includes a rectification circuit 103 and an oscillating circuit 104 as an oscillating portion. The rectification circuit 103 converts an AC (alternating-current) power into a DC (direct-current) power. The oscillating circuit 104 includes a primary coil 104A and a resistor 104B. In the oscillating circuit 104, the DC power is inputted from the rectification circuit 103 and is oscillated at a frequency of approximately 120 kHz, so that a magnetic flux energy of the AC power is generated from the primary coil 104A.

The recharged circuit 55 of the cordless handset 50 includes a secondary coil 201, a rectification circuit 202, a constant current circuit 203 and a secondary battery 204. Upon placement of the cordless handset 50 in the recessed portion 81*a* of the charging stand 80, the secondary coil 201 of the cordless handset 50 is opposed to the primary coil 104A and receives the magnetic flux energy of the AC power generated from the primary coil 104A of the charging stand 80. The rectification circuit 202 converts the AC power received in the secondary coil 201 into the DC power. The constant current circuit 203 limits the DC a constant current, that is, controls a current in the secondary coil 201 such that the current does not exceed a predetermined constant value. The secondary battery 204 is connected to the constant current circuit 203 and is charged (recharged) with the DC outputted from the constant current circuit 203.

In the present embodiment, a current detecting circuit 105 as a current detecting portion as one example of a detecting portion is provided in the recharging circuit 82 of the charging stand 80. The current detecting circuit 105 includes an A/D converter 105A, and detects a value I of a current flowing through the primary coil 104A of the oscillating circuit 104. More precisely, the current detecting circuit 105 detects the current value I, by means that the current detecting circuit 105 detects a voltage value of the resistor 104B through which the same electric current as the primary coil 104A flows, then the voltage value is digitalized by the A/D converter 105A and is inputted to the controller 101. Thus, the current detecting circuit 105 may be considered as another example of a detecting portion which detects a voltage value in the oscillating circuit 104.

Figure 5:
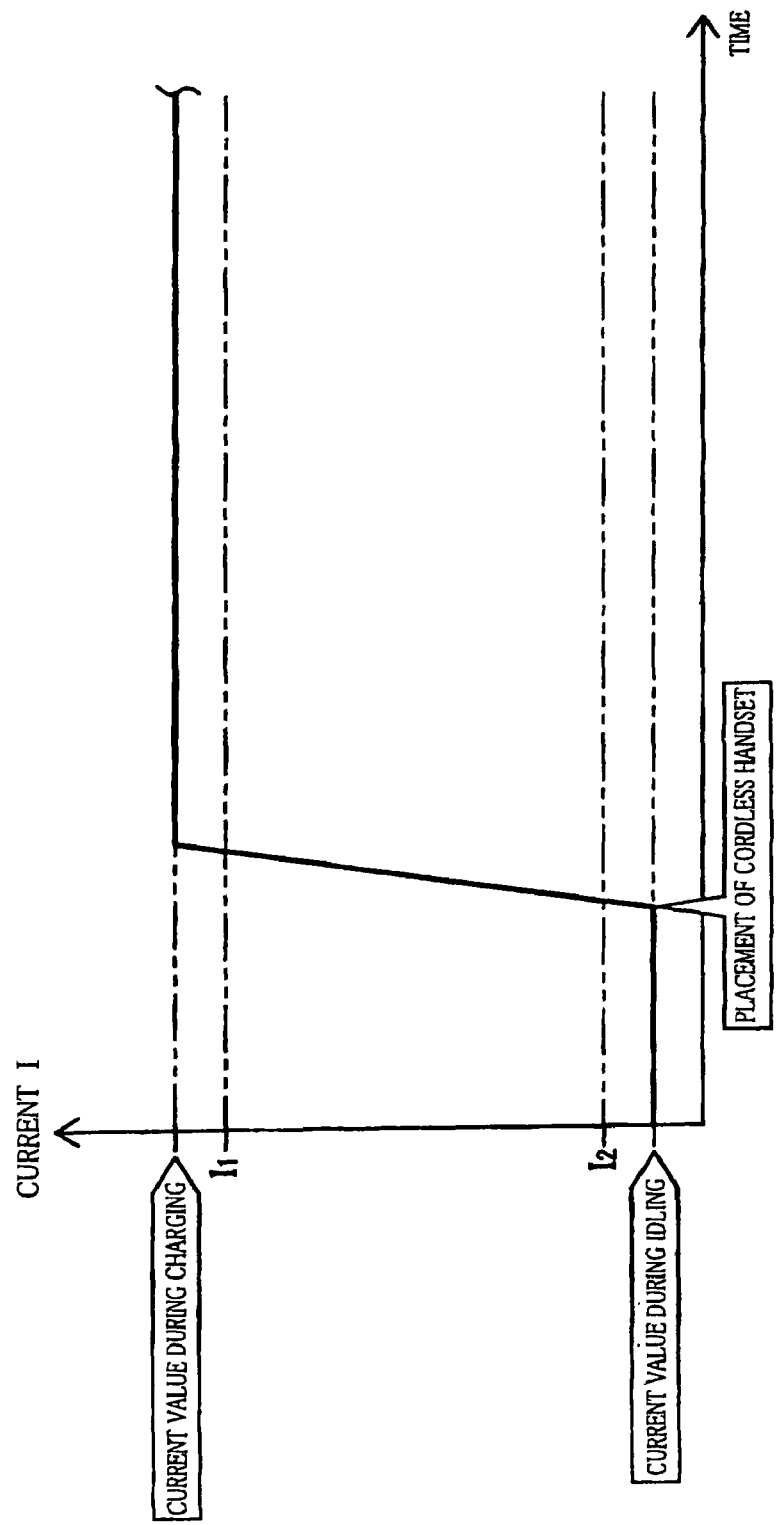
FIG. 5 is an illustrative view showing an electric current which flows through a primary coil of an oscillating circuit provided in the charging stand.

FIG. 5 shows the current I flowing through the primary coil 104A of the oscillating circuit 104. As shown in FIG. 5, in a case where the cordless handset 50 is placed in the recessed portion 81*a* of the charging stand 80, when the charging stand 80 is in a charging state in which the charging stand 80 charges the cordless handset 50, the value of the current I that is not smaller than a first current reference value $I_1$ flows through the primary coil 104A of the oscillating circuit 104. On the other hand, in a case where the cordless handset 50 is removed from the recessed portion 81*a*, when the charging stand 80 is in an idling state in which a charging operation is not performed, the value of the current I which is not larger than a second current reference value $I_2$ flows through the primary coil 104A.

Therefore, the controller 101 of the charging stand 80 detects the value of the current I flowing through the primary coil 104A of the oscillating circuit 104 so as to determine whether the cordless handset 50 is placed in the recessed portion 81*a* of the charging stand 80. Also, in a case where the controller 101 detects that the value of the current I flowing through the primary coil 104A is (positioned) between the first current reference value $I_1$ and the second current reference value $I_2$, the controller 101 can determine that a foreign matter such as a metallic object is placed in the recessed portion 81*a*.

In the present embodiment, as shown in FIG. 1, in the oscillating circuit 104 of the charging stand 80, a switch 106 as a switch portion for suspending (intercepting) the current flowing through the primary coil 104A is provided in a portion of the oscillating circuit 104 in which a current flowing therethrough is minimized. The switch 106 is operated by the controller 101. That is, the switch 106 is provided in a base circuit which controls an ON/OFF of a transistor arranged in series with the oscillating circuit 104. The base circuit constitutes the above-described portion of the oscillating circuit 104 in which the current flowing therethrough is minimized among the entirety of the oscillating circuit 104 and, when the controller 101 operates the switch 106 to open or turn off so as to break the base circuit, an oscillation of the oscillating circuit 104 is stopped. Thus, according to the value of the current I flowing through the primary coil 104A of the oscillating circuit 104, the controller 101 of the charging stand 80 operates the switch 106 of the oscillating circuit 104 to stop a generation of the magnetic flux energy by the primary coil 104A or to generate again the magnetic flux energy in the primary coil 104A, so that the metallic foreign matter placed in the recessed portion 81*a* of the charging stand 80 is prevented from being heated and the cordless handset 50 is charged when the cordless handset 50 is placed in the recessed portion 81*a*.

Figure 6:
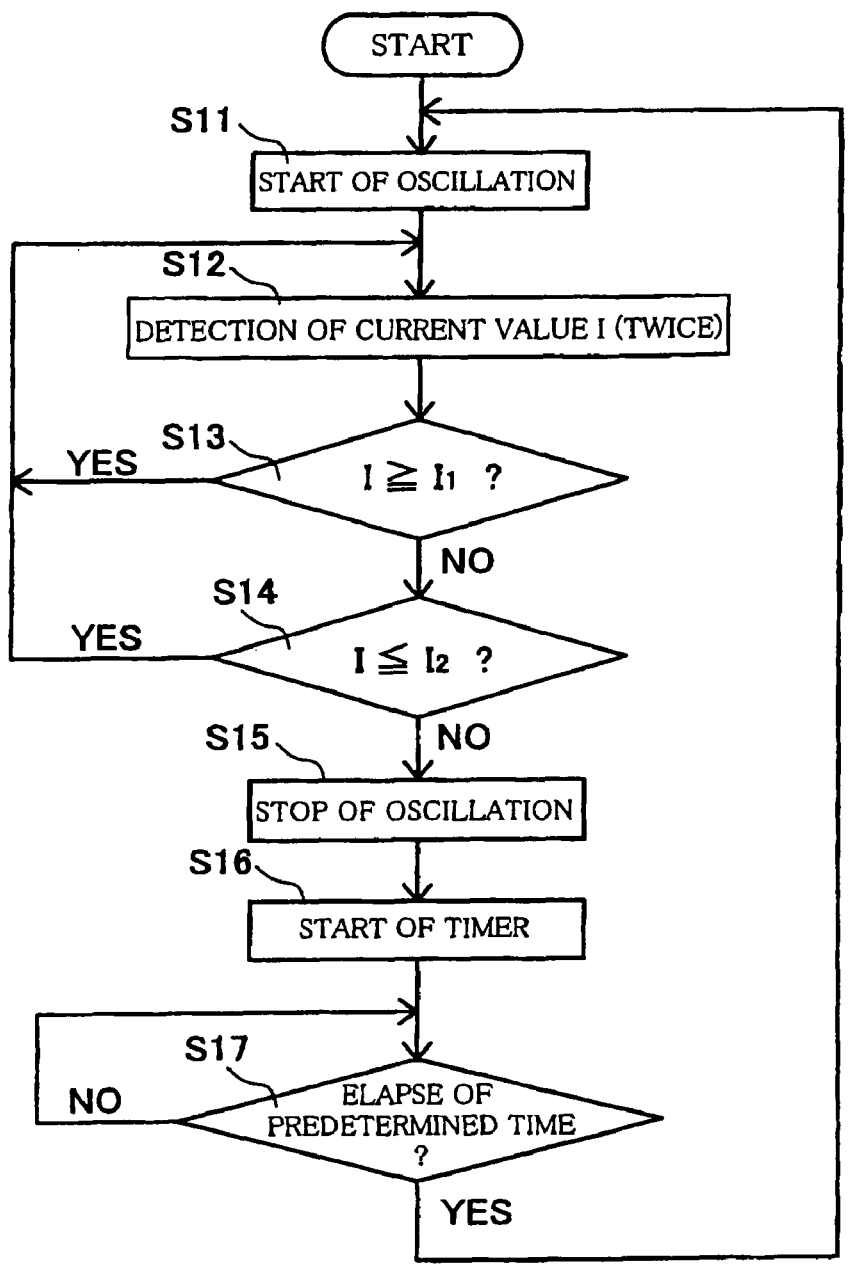
FIG. 6 is a flow chart illustrating a program for charging the cordless handset placed in a recessed portion of the charging stand while preventing heating of a foreign matter such as a metallic object placed in the recessed portion thereof.

FIG. 6 shows a flow chart illustrating a program for charging the cordless handset 50 placed in the recessed portion 81*a*, and preventing the foreign matter placed in the recessed portion 81*a* from being heated. The program shown in FIG. 6 is stored in the ROM of the controller 101 and is implemented by the CPU of the controller 101.

As shown in FIG. 6, first, in step S11, the charging stand 80 starts the oscillation of the oscillating circuit 104. The controller 101 operates the switch 106 of the oscillating circuit 104 to turn on or be closed so that the current I flows through the primary coil 104A and the oscillation of the oscillating circuit 104 starts, causing the generation of the magnetic flux energy in the primary coil 104A of the oscillating circuit 104.

In step S12, the value of the current I flowing through the primary coil 104A is detected. As mentioned before, the controller 101 detects the value of the current I flowing through the primary coil 104A, based on digital data inputted from the A/D converter 105A. The controller 101 detects the value of the current I twice, for a reason that will be described later.

In step S13, the controller 101 determines whether the value of the current I flowing through the primary coil 104A is not smaller than the first current reference value $I_1$. In a case where the controller 101 determines that the value of the current I flowing through the primary coil 104A is not smaller than the first current reference value $I_1$, i.e., an affirmative decision (Yes) is obtained in step S13, the charging stand 80 is in the charging state (shown in FIG. 5), so that implementing of the program is returned to step S12, and steps S12 and S13 are implemented again. On the other hand, in a case where the value of the current I flowing through the primary coil 104A is smaller than the first current reference value $I_1$, i.e., a negative decision (No) is obtained in step S13, step S14 is implemented.

In step S14, the controller 101 determines whether the value of the current I flowing through the primary coil 104A is not lager than the second current reference value $I_2$. In a case where it is determined that the value of the current I flowing through the primary coil 104A is not smaller than the second current reference value $I_2$, i.e., an affirmative decision (Yes) is obtained in step S14, the charging stand 80 is in the idling state (shown in FIG. 5), so that implementing of the program is returned to step S12, and steps S12 through S14 are repeated. On the other hand, in a case where the value of the current I flowing through the primary coil 104A is larger than the second current reference value $I_2$, i.e., a negative decision (No) is obtained in step S14, it is determined that the value of the current I flowing through the primary coil 104A is between the first current reference value $I_1$ and the second current reference value $I_2$, and that the metallic foreign matter is placed in the recessed portion 81a of the charging stand 80, and then step S15 is implemented.

In step S15, the oscillation of the oscillating circuit 104 is stopped. The controller 101 operates the switch 106 of the oscillating circuit 104 to turn off, so that no current I flows through the primary coil 104A and the generation of the magnetic flux energy in the primary coil 104A is stopped.

In step S16, a timer as a timer portion is started. The timer of the controller 101 is operated to start detecting elapse of a predetermined time.

In step S17, it is determined whether the elapse of the predetermined time is detected. That is, the controller 101 determines whether the predetermined time passes since the timer of the controller 101 is started in step S16. In a case where a negative decision (No) is obtained in step S17, step S17 is repeatedly implemented until the elapse of the predetermined time is detected. In a case where the elapse of the predetermined time is detected, i.e., an affirmative decision (Yes) is obtained in step S17, the program is returned to step S11. Therefore, the magnetic flux energy is generated again in the primary coil 104A. The elapse of the predetermined time may be detected by implementing another program.

Figure 7:
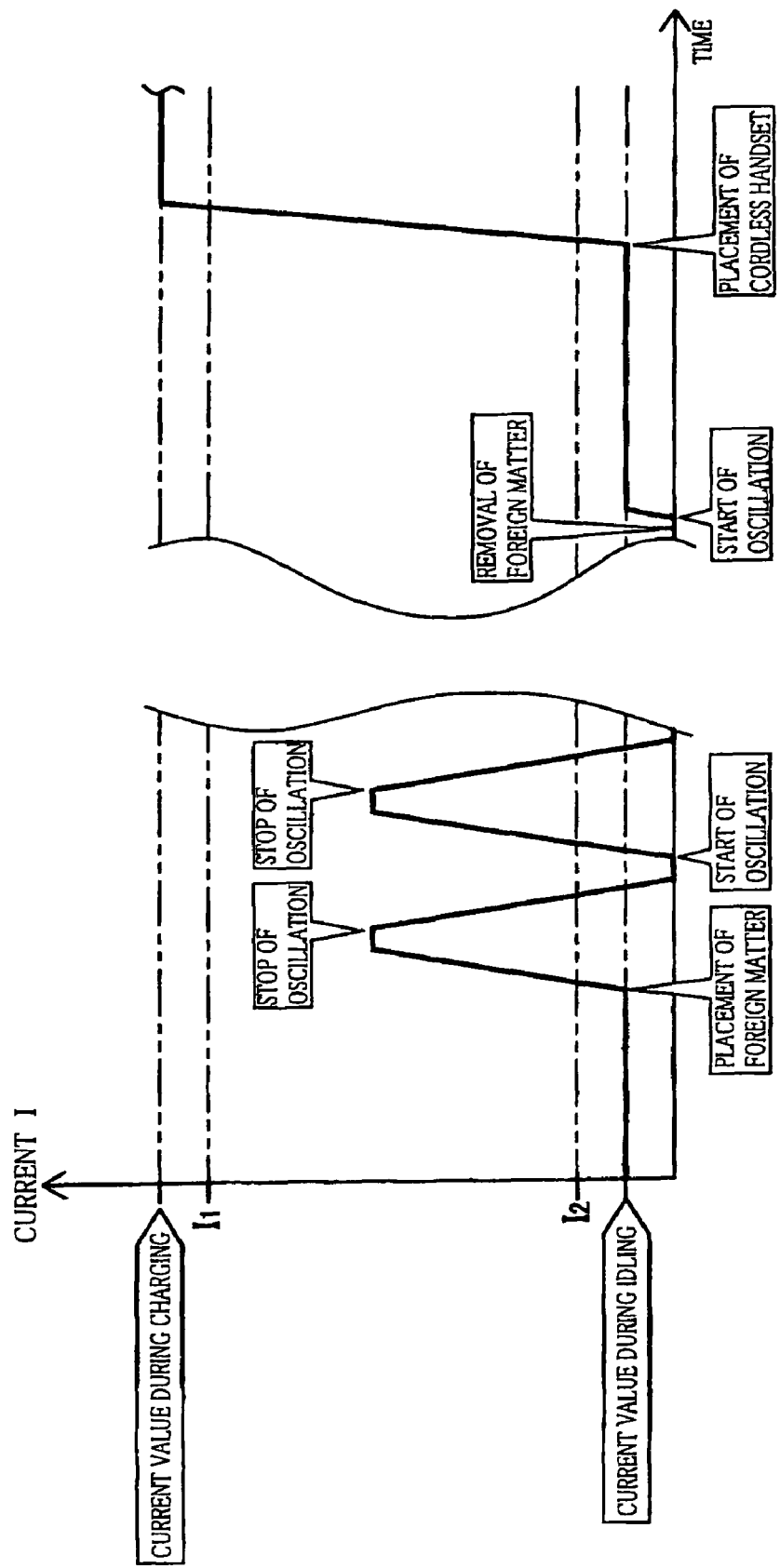
FIG. 7 is an illustrative view showing a relation between the electric current flowing through the primary coil of the oscillating circuit and a state of placement in the recessed portion of the charging stand.

FIG. 7 shows the current I flowing through the primary coil 104A of the oscillating circuit 104, in relation with a state of placement in the recessed portion 81a of the charging stand 80. In the idling state in which nothing is placed in the recessed portion 81a, a current I having a current value not larger than the second current reference value $I_2$ flows through the primary coil 104A. That is, in the flow chart shown in FIG. 6, a negative decision (No) is obtained in step S13, and then an affirmative decision (Yes) is obtained in step S14. Then, when the metallic foreign matter is placed in the recessed portion 81a, an eddy current flows through the metallic foreign matter and a current I with a current value between the first and second current reference values $I_1$ and $I_2$ flows through the primary coil 104A. That is, in the flow chart shown in FIG. 6, the negative decision (No) is obtained in step S13, and then the negative decision (No) is obtained in step S14. Thus, the oscillation is stopped (step S15) and no current I flows through the primary coil 104A, so that the charging function is stopped. Then, when the elapse of the predetermined time is detected, or the affirmative decision (Yes) is obtained in step S17, the oscillation of the oscillating circuit 104 is started (step S11) and the current I flows through the primary coil 104A, so that the charging function is recovered. In a case where the metallic foreign matter is kept placed in the recessed portion 81a, the current I with the current value between the first and second current reference values $I_1$, $I_2$ flows again through the primary coil 104A, or the negative decision (No) is obtained in step S14, the above-mentioned steps S15 through S17 are repeatedly implemented. Accordingly, the metallic foreign matter is prevented from being heated.

After the metallic foreign matter is removed from the recessed portion 81a, when the elapse of the predetermined time is detected, or the affirmative decision is obtained in step S17, and the oscillation of the oscillating circuit 104 is started (step S11), the current I starts to flow again through the primary coil 104A. However, since the charging stand 80 is in the idling state, the current I with a current value not smaller than the second current reference value $I_2$ flows through the primary coil 104A, i.e., the negative decision is obtained in step S13, and then the affirmative decision is obtained in step S14. Then, when the cordless handset 50 is placed in the recessed portion 81a, the charging stand 80 becomes in the charging state and the current I having a current value not smaller than the first current reference value $I_1$ flows through the primary coil 104A, i.e., the affirmative decision is obtained in step S13.

Figure 8:
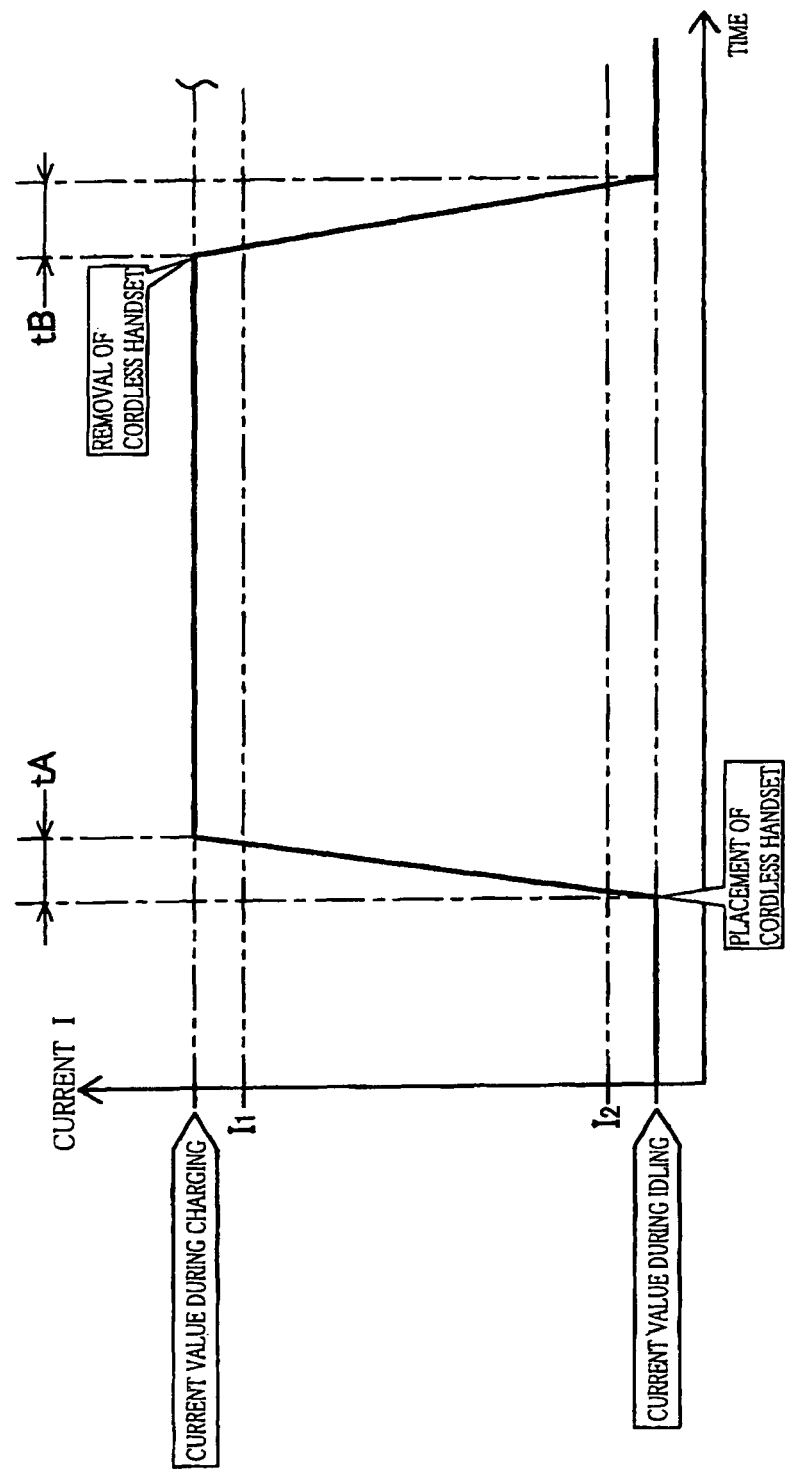
FIG. 8 is an illustrative view showing another relation between the electric current flowing through the primary coil of the oscillating circuit and a state of placement in the recessed portion of the charging stand.

However, as shown in FIG. 8, during a first transitional period right after the cordless handset 50 is placed in the recessed portion 81a of the charging stand 80, the current I having the current value between the first and second current reference values $I_1$, $I_2$ flows through the primary coil 104A of the oscillating circuit 104. A length of the first transitional period is indicated as a first transitional time tA and, for example, the length thereof is several msec (milliseconds). Similarly, during a second transitional period right after the cordless handset 50 is removed from the recessed portion 81a, the current I having the current value between the first and second current reference values $I_1$, $I_2$ flows through the primary coil 104A. A length of the second transitional period is indicated as a second transitional time tB and, for example, the length thereof is several msec. In a case where the current value I is detected during the above-mentioned transitional periods (step S12), it is erroneously determined that the metallic foreign matter is placed in the recessed portion 81a, or the negative decision is obtained in step S13 and the negative decision is obtained in step S14, and the oscillation of the oscillating circuit 104 (implementing steps S15 through S17 and S11) is unnecessarily stopped and restarted. Therefore, in the present embodiment, in step S12, the controller 101 detects the current value I flowing through the primary coil 104A successive two times with a predetermined interval so as to obtain two detected current values I. The predetermined interval is longer than the first transitional time tA and the second transitional time tB, the first transitional time tA corresponding to a length of time from the placement of the cordless handset 50 in the recessed portion 81a until placement of the detected current value I of the primary coil 104A from a transient state to a first steady state, the second transitional time tB corresponding to a length of time from removal of the cordless handset 50 from the recessed portion 81a until placement of the detected current value I from the transient state to a second steady state. Therefore, when one of the two detected current value I is in the transient state, it is prevented that the two detected current values I are both between the first and second current reference values $I_1$, $I_2$. Thus, in each of steps S13 and S14, only when the negative decision (No) is obtained based on either one of the two detected current values I, the negative decision is obtained. In other words, as long as the affirmative decision is obtained based on at least one of the two detected current values I, the affirmative decision is obtained in each of steps S13, S14. It can be considered that the current value I detected during the first transitional time tA or the second transitional time tB is ignored.

In the present embodiment, in the case in which the metallic foreign matter is placed in the recessed portion 81a of the charging stand 80 in which the cordless handset 50 as a recharged object is placeable, the eddy current flows through the foreign matter and the current I having the current value between the first and second current reference values $I_1$, $I_2$ flows through the primary coil 104A of the oscillating circuit 104. When the controller 101 detects the current value between the first, second current reference values $I_1$, $I_2$ via the current detecting circuit 105, i.e., the negative decision is obtained in step S14, the controller 101 operates the switch 106 to suspend flowing of the current I through the primary coil 104A (step S15). Accordingly, the generation of the magnetic flux energy in the primary coil 104A is stopped, so that the foreign matter placed in the recessed portion 81a is prevented from being heated with a simply structured circuit.

As shown in FIG. 1, the switch 106 of the oscillating circuit 104 is provided in a portion of the oscillating circuit 104 in which a current flowing therethrough is minimized. Therefore, a low-priced switch can be adopted for the switch 106, contributing to reduce the cost of manufacture.

In order to stop the generation of the magnetic flux energy in the primary coil 104A, instead of operating the switch 106 in the present embodiment, for example, the controller 101 may stop the oscillation of the oscillating circuit 104.

Then, in the charging stand 80, the timer of the controller 101 is operated (step S16). After the predetermined time elapses since the generation of the magnetic flux energy in the primary coil 104A is stopped, i.e., the affirmative decision is obtained in step S17, the switch 106 is operated such that the current flows again through the primary coil 104A (step S11). Thus, the magnetic flux energy is generated again from the primary coil 104A, so that the charging function can be restored (the charging operation can be performed again).

Further, in the present embodiment, since the controller 101 detects the value of the current I flowing through the primary coil 104A (step S12) after the magnetic flux energy is generated from the primary coil 104A (step S11), and compares the current value I with the two different current reference values consisting of the first current reference value $I_1$ as an upper current reference value and the second current reference value $I_2$ as a lower current reference value (steps S13, S14), the controller 101 can determine three different states of the charging stand 80 including: a state in which the charging operation can be performed (the charging state); a state in which the foreign matter is placed in the recessed portion 81a; and the idling state (shown in FIG. 5), so that, as shown in FIG. 7, the controller 101 can properly control the prevention of heating the foreign matter placed in the recessed portion 81a.

In the present embodiment, when the current value I of the current flowing through the primary coil 104A is not smaller than the first current reference value $I_1$, or the affirmative decision is obtained in step S13, the charging stand 80 is in the charging state. Therefore, as long as the current value I of the current flowing through the primary coil 104A is not smaller than the first current reference value $I_1$, the controller 101 repeatedly implements steps of the detection of the current value I (step S12) and the comparison of the current value I and the two reference values $I_1$, $I_2$ (step S13), and maintains the generation of the magnetic flux energy in the primary coil 104A and the charging state of the charging stand 80.

In the present embodiment, during the step of the detection of the current value I (step S12), the controller 101 detects the current value I twice successively, and determines that the foreign matter is placed in the recessed portion 81a in the case in which both of the two detected current values I are between the two reference values $I_1$, $I_2$. Therefore, the controller 101 can prevent an erroneous determination that the foreign matter is placed in the recessed portion 81a, based on a detected current value detected during the first and second transitional periods.

Furthermore, in the present embodiment, as shown in FIG. 1, the charging stand 80 includes the current detecting circuit 105 which detects only the current value I flowing through the primary coil 104A of the oscillating circuit 104, so that the current detecting circuit 105 as a detecting portion can be inexpensively constructed, contributing to reduce the cost of manufacturing.

Furthermore, as shown in FIG. 1, the recharged circuit 55 of the cordless handset 50 includes the constant current circuit 203, so that a constant current can flow through the recharged circuit 55, regardless of a recharged state of the secondary battery 204. When the cordless handset 50 is placed in the recessed portion 81a, in the charging stand 80, the current flowing through the primary coil 104A is kept constant. Therefore, it is reliably determined in the charging stand 80 that the cordless handset 50 is placed in the recessed portion 81a.

According to the present embodiment, a portion of the controller 101 that implements steps S12 through S15 constitutes a two-reference-value-comparing controller which compares the detected current value I detected by the current detecting circuit 105 with the two reference values $I_1$, $I_2$ and controls the generation of the magnetic flux energy based on first comparison of the detected current value I with one $I_1$ of the two reference values and second comparison of the detected current value I with the other $I_2$ of the two reference values, and also constitutes an erroneous-determination-preventing-type stop portion. Further, a portion of the controller 101 that implements steps S16 and S17 constitutes an energy-restarting portion which restarts the generation of the magnetic flux energy in a case of satisfaction of a second condition that the predetermined time elapses after stopping of the generation of the magnetic flux energy. Furthermore, a portion of the controller 101 that implements steps S12 and S13 constitutes an oscillation-maintaining portion.

Figure 9:
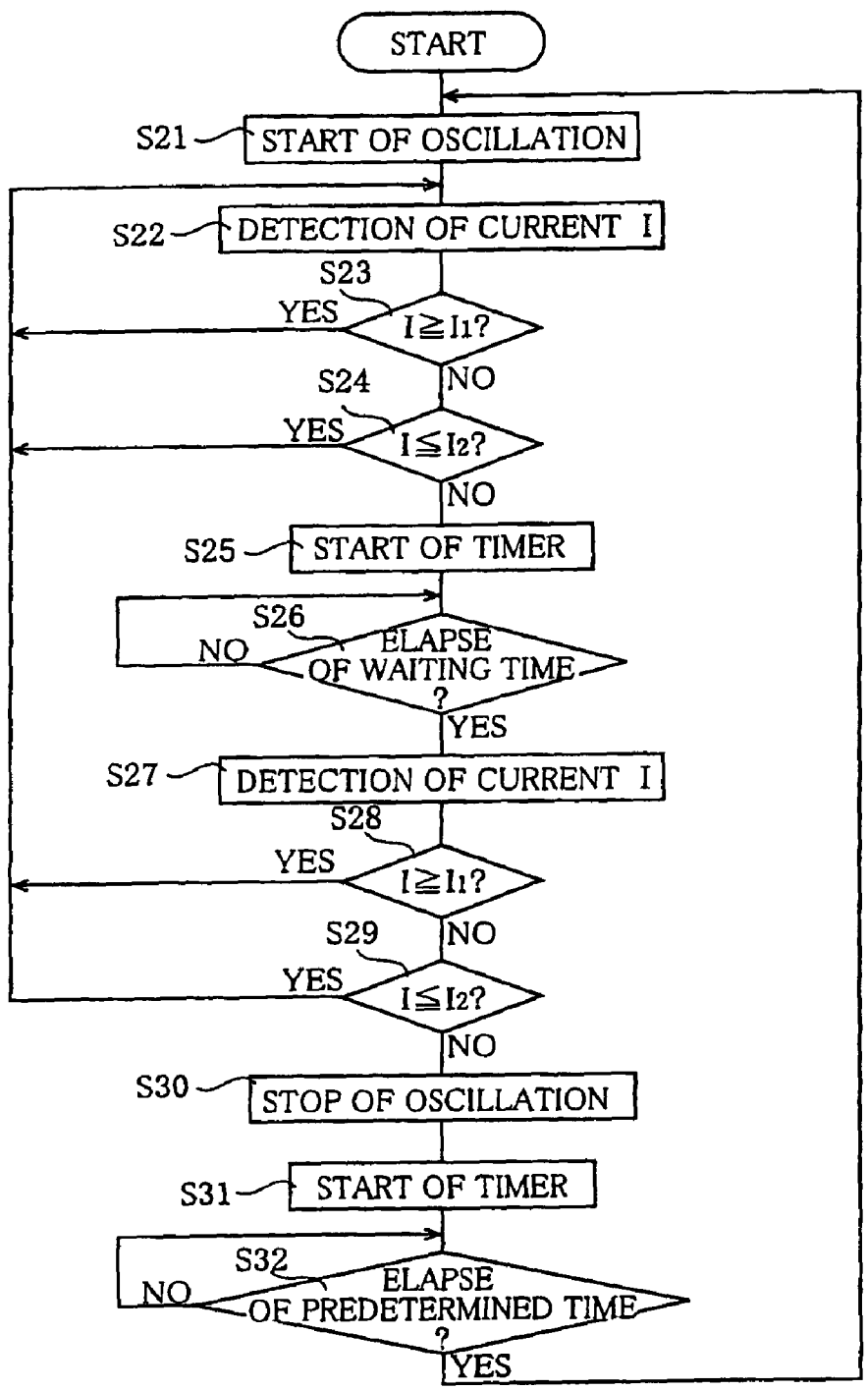
FIG. 9 is a flow chart illustrating a program which is similar to that illustrated in FIG. 6 and which is implemented in a non-contact charger as a second embodiment to which the present invention is applied.

An erroneous-determination-preventing-type stop portion which prevents an erroneous determination that the foreign matter is placed in the recessed portion 81a, based on a first detected value I detected during the first transitional time tA right after the cordless handset 60 is placed in the recessed portion 81a, and a second detected value I detected during the second transitional time tB right after the cordless handset 50 is removed from the recessed portion 81a, is not limited to a feature illustrated in the flow chart of FIG. 6. FIG. 9 is a flow chart illustrating a program which is implemented in a second embodiment of the invention with use of a modification of the erroneous-determination-preventing-type stop portion. In the flow chart of FIG. 9, steps S21, S23, S24, and S30 through S32 are the same as steps S11, and S13 through S17 in the flow chart of FIG. 6, and steps S22, and S25 through S29 are different from the feature illustrated in the flow chart of FIG. 6, so that only different steps will be described below. In step S12 illustrated in the flow chart of FIG. 6, the current value I flowing through the primary coil 104A are detected twice with the predetermined interval, however, in the present embodiment, in step S22, the current value I is detected only once. Then, in steps S23 and S24, the detected current value I is compared with the first, second current reference values $I_1$, $I_2$, respectively. In a case where respective negative decisions are obtained in steps S23, S24, steps following step S15 are implemented.

The respective negative decisions are obtained in steps S23, S24 in a case where the current value I is between the first and second current reference values $I_1$, $I_2$, however, the current value I detected during the first and second transitional times tA, tB (the first and second transitional periods) can possibly be between the first and second current reference values $I_1$, $I_2$. Therefore, in the present embodiment, after elapse of a waiting time (for example, 10 msec) is detected by the timer in steps S25, S26, the value of the current I flowing through the primary coil 104A is detected in step S27. Since the waiting time is longer than the first and second transitional times tA, tB, the detected current value I in step S27 is different from current values during the first and second transitional times tA, tB. Therefore, generally, an affirmative decision is obtained in either one of steps S28, S29 which are the same as steps S23, S24, so that step S30 and steps following step S30 are not implemented. On the other hand, in the case in which the metallic foreign matter is placed in the recessed portion 81a, respective negative decisions are obtained in steps S28, S29, and then the oscillation of the oscillating circuit 104 is stopped in step S30 and steps S31, S32 are repeatedly implemented until the predetermined time elapses.

In the present embodiment, in the case in which the detected current value I of the primary coil 104A is between the first and second current reference values $I_1$, $I_2$, the current value I is detected again after the elapse of the waiting time. In a case where the re-detected current value I detected again after the elapse of the waiting time is between the first and second current reference values $I_1$, $I_2$, it is determined that the metallic foreign matter is placed in the recessed portion 81a and the oscillation of the oscillating circuit 104 is stopped. Accordingly, it is prevented that the oscillation of the oscillating circuit 104 is erroneously stopped, based on the detected values I detected during the first and second transitional times tA, tB. Apparently from the above description, a portion of the controller 101 that implements steps S23 through S26 constitutes a re-detecting portion.

Figure 10:
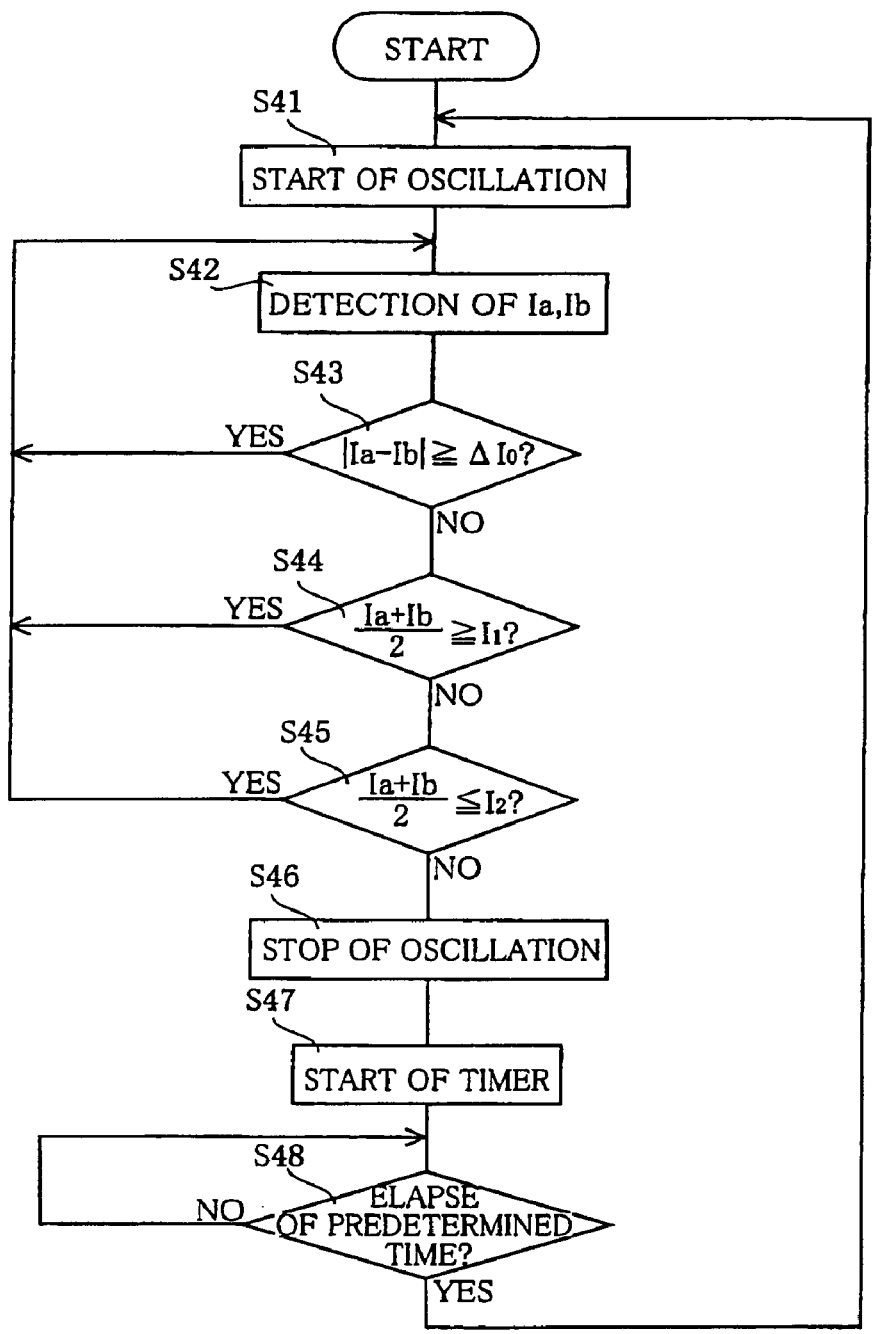
FIG. 10 is a flow chart illustrating a program which is similar to that illustrated in FIG. 6 and which is implemented in a non-contact charger as a third embodiment to which the present invention is applied.

FIG. 10 is a flow chart illustrating a program which is implemented in a third embodiment of the invention with use of another modification of the erroneous-determination-preventing-type stop portion. In the flow chart of FIG. 10, steps S41, and S46 through S48 are the same as steps S11, and S15 through S17 in the flow chart of FIG. 6, and steps S42 through S46 are different from the feature illustrated in the flow chart of FIG. 6, so that only different steps will be described below.

In step S42, two current values Ia, Ib of the current flowing through the primary coil 104A are successively detected with a predetermined interval, similar to step S12 in FIG. 6, however, in the present embodiment, the predetermined interval is shorter than the first and second transitional times tA, tB. Then, in step S43, the controller 101 determines whether an absolute value of a difference between the two current values Ia, Ib is not smaller than a predetermined current difference $\Delta I_0$. In a case where the two current values Ia, Ib are detected during the first and second transitional times tA, tB, an affirmative decision is obtained in step S43, and an implementation of the program is returned to S42. On the other hand, in a case where a negative decision is obtained in step S43, the controller 101 determines whether an average value of the two current values Ia, Ib is not smaller than the first current reference value $I_1$ in step S44, and determines whether the average value of the two current values Ia, Ib is not larger than the second current reference value $I_2$ in step S45. In a case where an affirmative decision is obtained in either one of steps S44, S45, the implementation of the program is returned to S42. In a case where respective negative decisions are obtained in steps S44, S45, the controller determines that the foreign matter is placed in the recessed portion 81a and stops the oscillation of the oscillating circuit 104 in step S46. Apparently from the above description, a portion of the controller 101 that implements steps S42, S43 constitutes a transitional-state detecting portion, and a portion of the controller 101 that implements step S42 again in the case in which the affirmative decision is obtained in step S43 and the transitional-state detecting portion constitute a re-detecting portion.

It is to be understood that the present invention may be embodied with various changes and improvements that may occur to a person skilled in the art, without departing from the spirit and scope of the invention defined in the appended claims. For example, the oscillation of the oscillating circuit 104 is stopped (step S15), because of a determination that the foreign matter such as the metal object is placed in the recessed portion 81a of the charging stand 80. The charging stand 80 may include an alarm device for warning the user of the determination, such as a speaker which sounds an alarm, and a wireless device to transmit data including the determination to the main phone 10 and the cordless handset 50 such that the main phone 10 and the cordless handset 50 sound an alarm and/or indicate an alarm to notice the user.

Also, a magnetic sensor such as a pick-up coil and a hall element may be provided in the vicinity of the primary coil 104A so as to detect the magnetic flux energy in the primary coil 104A and indirectly detect the value of the current I flowing through the primary coil 104A.

In the illustrated embodiments, when the eddy current flows through the primary coil 104A of the oscillating circuit 104 in the case in which the foreign matter is placed in the recessed portion 81a, a voltage value V of the primary coil 104A is changed within a range between a first voltage value (reference value) during the charging state and a second voltage value (reference value) during the idling state. In this sense, the charging stand 80 may include a voltage detecting circuit for detecting the voltage value V of the primary coil 104A, instead of the current detecting circuit 105. In the thus modified arrangement, the charging stand 80 can enjoy the same effects provided in the illustrated embodiments.

In the charging stand 80, the oscillation of the oscillating circuit 104 may be stopped or started by means of a construction of a circuit, instead of the CPU, the RAM, the ROM, the EEPROM.

The present invention is applicable to a technology for detecting and preventing an abnormal charging.

What is claimed is:

1. A non-contact charger comprising:
    a casing having a recessed portion in which a cordless handset is placed; a primary coil which is provided in the casing to be opposed to the cordless handset upon placement of the cordless handset in the recessed portion of the casing;
    an oscillating portion which oscillates a primary coil to generate a magnetic flux energy;
    a detecting portion which detects at least one of a current value and a voltage value in the oscillating portion; and
    a controller which stops a generation of the magnetic flux energy based on the at least one of the current value and the voltage value detected by the detecting portion;

wherein:
the controller includes a two-reference-value-comparing portion which compares the at least one of the current value and the voltage value as a detected value detected by the detecting portion with a lower reference value and an upper reference value different from each other, and which controls the generation of the magnetic flux energy based on a first comparison of the detected value with the upper reference value and second comparison of the detected value with the lower reference value;
the controller includes an oscillation-maintaining portion which controls the oscillating portion to maintain the generation of the magnetic flux energy while the detected value is not smaller than the upper reference value and the detected value is not larger than the lower reference value; and
the controller is configured to stop the generation of the magnetic flux energy when the detected value is smaller than the upper reference value and the detected value is not larger than the lower reference value.

2. The non-contact charger according to claim 1, wherein the controller stops the generation of the magnetic flux energy by stopping an oscillation of the oscillating portion.

3. The non-contact charger according to claim 1, further comprising a switch portion, and
wherein the controller stops the generation of the magnetic flux energy by operating the switch portion.

4. The non-contact charger according to claim 3, wherein the switch portion is provided in a portion of the oscillating portion in which a current flowing therethrough is minimized.

5. The non-contact charger according to claim 1, wherein the controller includes an energy-restarting portion which restarts the generation of the magnetic flux energy in a case where a predetermined condition is satisfied after the generation of the magnetic flux energy is stopped.

6. The non-contact charger according to claim 5, wherein the predetermined condition includes a condition in which a predetermined time elapses after the generation the magnetic flux energy is stopped.

7. The non-contact charger according to claim 6, wherein the controller includes a timer portion which detects elapse of the predetermined time, and
wherein the controller restarts the generation of the magnetic flux energy based on a detection of the elapse of the predetermined time by the timer portion.

8. The non-contact charger according to claim 1, wherein the controller includes an erroneous-determination-preventing-type stop portion which stops the generation of the magnetic flux energy, and prevents an erroneous determination, which erroneously determines that a foreign matter is placed in the recessed portion of the casing based on the detected value when the detected value is in a transient state.

9. The non-contact charger according to claim 8, wherein the erroneous-determination-preventing-type stop portion includes a re-detecting portion which causes the detecting portion to detect again the detected value in a case where the detected value is in the transient state.

10. A non-contact charger comprising:
a casing having a recessed portion in which a cordless handset is placed; a primary coil which is provided in the casing to be opposed to the cordless handset upon placement of the cordless handset in the recessed portion of the casing;
an oscillating portion which oscillates a primary coil to generate a magnetic flux energy;
a detecting portion which detects at least one of a current value and a voltage value in the oscillating portion; and
a controller which stops a generation of the magnetic flux energy based on the at least one of the current value and the voltage value detected by the detecting portion;
wherein:
the controller includes an erroneous-determination-preventing-type stop portion which stops the generation of the magnetic flux energy, and prevents an erroneous determination, which erroneously determines that a foreign matter is placed in the recessed portion of the casing based on the detected value when the detected value is in a transient state;
the erroneous-determination-preventing-type stop portion includes a re-detecting portion which causes the detecting portion to detect again the detected value in a case where the detected value is in the transient state;
the controller includes a two-reference-value-comparing portion which compares the at least one of the current value and the voltage value as a detected value detected by the detecting portion with two reference values different from each other, and which controls the generation of the magnetic flux energy based on first comparison of the detected value with one of the two reference values and second comparison of the detected value with the other of the two reference values; and
the re-detecting portion determines that the detected value is in the transient state in a case where the detected value is between the two reference values, and causes the detecting portion to detect again the detected value after elapse of a waiting time that is longer than a first transitional time and a second transitional time, the first transitional time corresponding to a length of time from the placement of the cordless handset in the recessed portion of the casing until placement of the detected value from the transient state to a first steady state, the second transitional time corresponding to a length of time from removal of the cordless handset from the recessed portion of the casing until placement of the detected value from the transient state to a second steady state.

11. A non-contact charger comprising:
a casing having a recessed portion in which a cordless handset is placed; a primary coil which is provided in the casing to be opposed to the cordless handset upon placement of the cordless handset in the recessed portion of the casing;
an oscillating portion which oscillates a primary coil to generate a magnetic flux energy;
a detecting portion which detects at least one of a current value and a voltage value in the oscillating portion; and
a controller which stops a generation of the magnetic flux energy based on the at least one of the current value and the voltage value detected by the detecting portion;
wherein:
the controller includes an erroneous-determination-preventing-type stop portion which stops the generation of the magnetic flux energy, and prevents an erroneous determination, which erroneously determines that a foreign matter is placed in the recessed portion of the casing based on the detected value when the detected value is in a transient state;
the erroneous-determination-preventing-type stop portion includes a re-detecting portion which causes the detecting portion to detect again the detected value in a case where the detected value is in the transient state;

wherein:

the re-detecting portion includes a transitional-state detecting portion which causes the detecting portion to detect the detected value twice with a predetermined interval so as to obtain two detected values and which determines that the detected value is in the transient state in a case where a difference between the two detected values is not smaller than a predetermined difference.

12. A non-contact charger comprising:

a casing having a recessed portion in which a cordless handset is placed; a primary coil which is provided in the casing to be opposed to the cordless handset upon placement of the cordless handset in the recessed portion of the casing;

an oscillating portion which oscillates a primary coil to generate a magnetic flux energy;

a detecting portion which detects at least one of a current value and a voltage value in the oscillating portion; and a controller which stops a generation of the magnetic flux energy based on the at least one of the current value and the voltage value detected by the detecting portion;

wherein:

the controller includes an erroneous-determination-preventing-type stop portion which stops the generation of the magnetic flux energy, and prevents an erroneous determination, which erroneously determines that a foreign matter is placed in the recessed portion of the casing based on the detected value when the detected value is in a transient state;

the erroneous-determination-preventing-type stop portion causes the detecting portion to detect the detected value twice so as to obtain two detected values with an interval that is longer than a first transitional time and a second transitional time, the first transitional time corresponding to a length of time from the placement of the cordless handset in the recessed portion of the casing until placement of the detected value from the transient state to a first steady state, the second transitional time corresponding to a length of time from removal of the cordless handset from the recessed portion of the casing until placement of the detected value from the transient state to a second steady state, and stops the generation of the magnetic flux energy in a case where both of the two detected values are between the two reference values.

13. The non-contact charger according to claim 1, wherein the detecting portion includes a circuit which detects the current value in the oscillating portion.

14. A non-contact charging system comprising:

the non-contact charger according to claim 1; and the cordless handset which is freely attachable to and detachable from the recessed portion of the casing and which includes a secondary coil which is opposed to the primary coil upon placement of the cordless handset in the recessed portion.

15. The non-contact charging system according to claim 14, wherein the cordless handset further includes a constant current circuit which controls a current in the secondary coil such that the current is controlled to have a predetermined constant value.

* * * * *